United States Patent
Matsumura et al.

(10) Patent No.: US 12,550,149 B2
(45) Date of Patent: Feb. 10, 2026

(54) USER TERMINAL

(71) Applicant: NTT DOCOMO, INC., Tokyo (JP)

(72) Inventors: Yuki Matsumura, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 1071 days.

(21) Appl. No.: 17/287,242

(22) PCT Filed: Oct. 31, 2018

(86) PCT No.: PCT/JP2018/040607
§ 371 (c)(1),
(2) Date: Apr. 21, 2021

(87) PCT Pub. No.: WO2020/090061
PCT Pub. Date: May 7, 2020

(65) Prior Publication Data
US 2021/0385849 A1    Dec. 9, 2021

(51) Int. Cl.
*H04W 72/23*     (2023.01)
*H04L 5/00*      (2006.01)
*H04W 72/044*    (2023.01)
*H04W 72/1268*   (2023.01)

(52) U.S. Cl.
CPC .......... *H04W 72/23* (2023.01); *H04L 5/0051* (2013.01); *H04W 72/046* (2013.01); *H04W 72/1268* (2013.01)

(58) Field of Classification Search
CPC ............ H04W 72/23; H04W 72/046; H04W 72/1268; H04B 7/0617; H04B 7/0639; H04B 7/06966; H04B 7/0695; H04B 7/088; H04L 5/0023; H04L 5/0048; H04L 5/0051
USPC ........................................ 370/329
See application file for complete search history.

(56) References Cited

U.S. PATENT DOCUMENTS

| | | | |
|---|---|---|---|
| 10,873,966 B2* | 12/2020 | Papasakellariou | H04W 72/23 |
| 10,972,244 B2* | 4/2021 | Guo | H04W 72/51 |
| 11,026,226 B2* | 6/2021 | Yang | H04W 72/21 |
| 11,121,897 B2* | 9/2021 | Xiong | H04L 27/2613 |

(Continued)

FOREIGN PATENT DOCUMENTS

WO    2018/135199 A1    7/2018

OTHER PUBLICATIONS

International Search Report issued in PCT/JP2018/040607 on Dec. 25, 2018 (1 page).

(Continued)

*Primary Examiner* — Jean A Gelin
(74) *Attorney, Agent, or Firm* — Osha Bergman Watanabe & Burton LLP

(57) ABSTRACT

User terminal according to one aspect of the present disclosure includes: a control section configured to determine a given spatial domain filter used for UL transmission based on at least one of presence or absence of report regarding support for beam correspondence, presence or absence of a configuration of spatial relation information, and a type of downlink control information that schedules UL transmission; and a transmitting section configured to perform UL transmission using the given spatial domain filter for appropriate selection of a UL beam applied to UL transmission.

5 Claims, 10 Drawing Sheets

(56) References Cited

U.S. PATENT DOCUMENTS

| | | | | |
|---|---|---|---|---|
| 11,330,575 | B2* | 5/2022 | Lin | H04W 80/08 |
| 11,438,898 | B2* | 9/2022 | Chen | H04B 7/0695 |
| 2011/0243262 | A1* | 10/2011 | Ratasuk | H04L 5/003 |
| | | | | 375/260 |
| 2019/0306924 | A1* | 10/2019 | Zhang | H04B 7/063 |
| 2019/0349964 | A1* | 11/2019 | Liou | H04W 76/27 |
| 2020/0044797 | A1* | 2/2020 | Guo | H04W 72/51 |
| 2020/0053724 | A1* | 2/2020 | MolavianJazi | H04W 52/281 |
| 2020/0092055 | A1* | 3/2020 | Choi | H04L 5/005 |
| 2020/0119799 | A1* | 4/2020 | Jung | H04W 52/36 |
| 2020/0373969 | A1* | 11/2020 | Tsai | H04W 74/0833 |
| 2021/0067289 | A1* | 3/2021 | Zhu | H04B 7/088 |
| 2021/0159966 | A1* | 5/2021 | Xi | H04B 7/088 |
| 2021/0385844 | A1* | 12/2021 | Yuan | H04W 72/20 |
| 2023/0171783 | A1* | 6/2023 | Khoshnevisan | H04L 5/0053 |
| | | | | 370/329 |

OTHER PUBLICATIONS

Written Opinion of the International Searching Authority issued in PCT/JP2018/040607 on Dec. 25, 2018 (3 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

3GPP TSG RAN WG1 Meeting #92b; R1-1805514 "Feature lead summary on beam measurement and reporting" Ericsson; Sanya, China; Apr. 16-20, 2018 (25 pages).

3GPP TSG RAN WG1 Meeting #94b; R1-1810749 "Remaining Issues on Multi-antenna Scheme" Intel Corporation; Chengdu, China; Oct. 8-12, 2018 (4 pages).

Extended European Search Report issued in European Application No. 18938632.9, dated May 31, 2022 (12 pages).

Office Action issued in Japanese Application No. 2020-554689; Dated Jul. 26, 2022 (8 pages).

3GPP TSG-RAN WG1 Meeting #94; Tdoc R1-1809759 "Feature lead summary beam management" Ericsson; Gothenburg; Aug. 20-24, 2018 (24 pages).

Office Action issued in Indian Application No. 202117021139; Dated Dec. 16, 2022 (5 pages).

Office Action issued in Korean Application No. 10-2021-7013596; Dated Feb. 3, 2023 (11 pages).

Office Action issued in Chinese Application No. 201880100566.8 dated Jun. 7, 2023 (15 pages).

Office Action issued in Chinese Application No. 201880100566.8 dated Nov. 25, 2023 (11 pages).

Office Action issued in corresponding European Application No. 18938632.9, mailed Apr. 17, 2024 (7 pages).

3GPP TSG RAN WG1 Meeting #94bis; R1-1811880 "Summary of SRS" Sony; Chengdu, China; Oct. 8-12, 2018 (57 pages).

3GPP TSG RAN WG1 Meeting #94bis; R1-1811867 "Summary on Beam Failure Recovery" MediaTek Inc.; Chengdu, China; Oct. 15-19, 2018 (30 pages).

Extended European Search Report issued in European Application No. 24174491.1, dated Aug. 26, 2024 (7 pages).

* cited by examiner

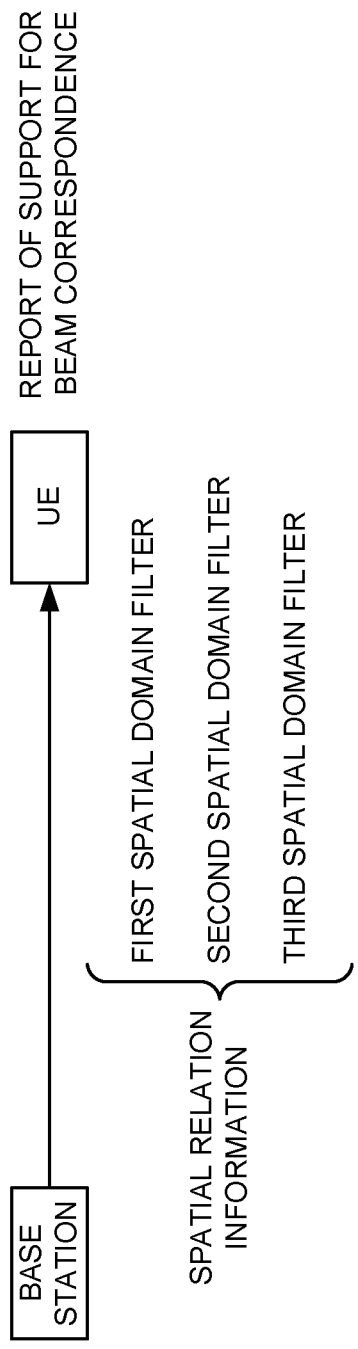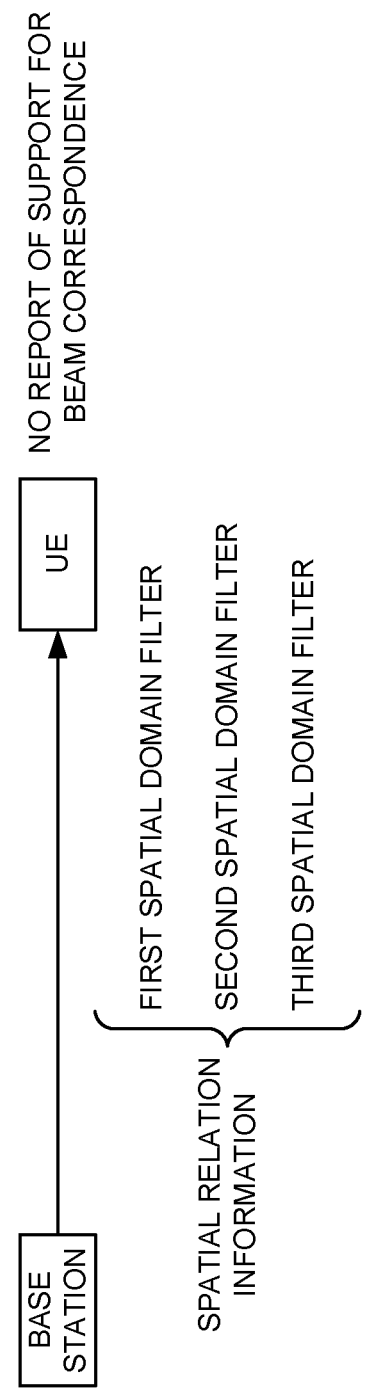

USER TERMINAL

TECHNICAL FIELD

The present disclosure relates to user terminal in a next-generation mobile communication system.

BACKGROUND ART

In the universal mobile telecommunications system (UMTS) network, the specifications of long term evolution (LTE) have been drafted for the purpose of further increasing high speed data rates, providing lower delays and the like (see Non Patent Literature 1). Further, the specifications of LTE Advanced (LTE-A, LTE Rel. 10, 11, 12, 13) have been drafted for the purpose of further increasing the capacity and advancement of LTE (LTE Rel. 8, 9).

Successor systems of LTE (for example, Future Radio Access (FRA), 5th generation mobile communication system (5G), 5G+ (plus), New Radio (NR), New radio access (NX), Future generation radio access (FX), LTE Rel. 14 or 15 or later versions) are also under study.

In an existing LTE system (for example, LTE Rel. 8 to 14), a base station uses downlink control information (DCI) to notify the user equipment (UE) of a transmission instruction of a physical uplink shared channel (PUSCH).

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In future radio communication systems (e.g., NR), the UE is considered to determine UL beams (or spatial domain filters) based on information notified by the base station.

On the other hand, how to determine the UL beam under specific conditions has not been fully considered. Examples of the specific conditions include the time when beam correspondence is not supported, the time when spatial relation information is not configured, the time when an uplink control channel is scheduled by downlink control information that does not include an SRS resource identification field, and the like.

Therefore, one of the objects of the present disclosure is to provide user terminal capable of appropriately selecting a UL beam applied to UL transmission.

Solution to Problem

User terminal according to one aspect of the present disclosure includes: a control section configured to determine a given spatial domain filter used for UL transmission based on at least one of presence or absence of report regarding support for beam correspondence, presence or absence of a configuration of spatial relation information, and a type of downlink control information that schedules UL transmission; and a transmitting section configured to perform UL transmission using the given spatial domain filter.

Advantageous Effects of Invention

According to one aspect of the present disclosure, a UL beam applied to UL transmission can be appropriately selected.

BRIEF DESCRIPTION OF DRAWINGS

FIGS. 3A and 3B are diagrams illustrating an example of spatial relation information configured in the UE from the base station.

DESCRIPTION OF EMBODIMENTS (SRS)

Figure 1:
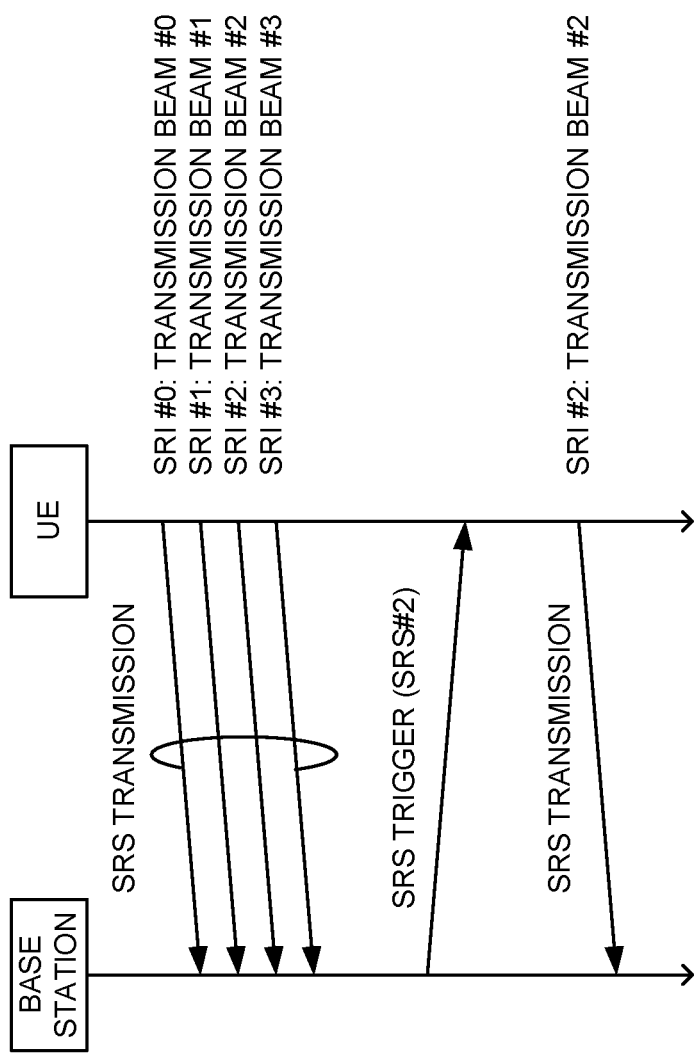
FIG. 1 is a diagram illustrating an example of UL beam management.

In the NR, a sounding reference signal (SRS) has a wide range of usages. SRSs in the NR are used not only for UL CSI measurements as used in existing LTE (LTE Rel. 8 to 14), but also for DL CSI measurements, beam management, and the like.

In the UE, one or a plurality of SRS resources may be configured. The SRS resource may be specified by an SRS resource index (SRI).

Each SRS resource may include one or a plurality of SRS ports (may correspond to one or a plurality of SRS ports). For example, the number of ports of each SRS may be one, two, four and the like.

In the UE, one or a plurality of SRS resource sets may be configured. One SRS resource set may be associated with a given number of SRS resources. The UE may commonly use a higher layer parameter for the SRS resources included in one SRS resource set. Note that, in the present disclosure, the resource set may be read as a resource group, simply a group and the like.

At least one of information regarding the SRS resource set and the SRS resource may be configured in the UE using the higher layer signaling, physical layer signaling, or a combination thereof. Here, the higher layer signaling may be, for example, any of radio resource control (RRC) signaling, medium access control (MAC) signaling, broadcast information and the like, or a combination thereof.

For the MAC signaling, for example, a MAC control element (MAC CE), a MAC protocol data unit (PDU), or the like may be used. The broadcast information may be, for example, a master information block (MIB), a system information block (SIB), remaining minimum system information (RMSI), other system information (OSI), or the like.

The physical layer signaling may be, for example, downlink control information (DCI).

The SRS configuration information (for example, an RRC information element "SRS-Config") may include SRS resource set configuration information, SRS resource configuration information and the like.

The SRS resource set configuration information (for example, an RRC parameter "SRS-ResourceSet") may include information on an SRS resource set identifier (ID) (SRS-ResourceSetId), a list of SRS resource IDs (SRS-ResourceId) used in the resource set, an SRS resource type, and SRS usage.

Herein, the SRS resource type may indicate any one of a periodic SRS (P-SRS), a semi-persistent SRS (SP-SRS), and an aperiodic CSI (A-SRS). Note that the UE may transmit a P-SRS and an SP-SRS periodically (or periodically after activated), and transmit an A-SRS based on an SRS request in DCI.

Further, the SRS usage (the RRC parameter "usage" or the Layer-1 (L1) parameter "SRS-SetUse") may be, for example, beam management, codebook, non-codebook, antenna switching, or the like. An SRS used for codebook or non-codebook may be used to determine a precoder for codebook-based or non-codebook-based PUSCH transmission based on an SRI.

For an SRS used for beam management, it may be assumed that only one SRS resource per SRS resource set can be transmitted at a given time instant. Note that when different SRS resources belong to different SRS resource sets, these SRS resources may be transmitted at the same time.

The SRS resource configuration information (for example, an RRC parameter "SRS-Resource") may include an SRS resource ID (SRS-ResourceId), the number of SRS ports, an SRS port number, transmission Comb, SRS resource mapping (for example, time and/or frequency resource position, resource offset, resource periodicity, the repetition number, the number of SRS symbols, an SRS bandwidth and the like), hopping relation information, the SRS resource type, a sequence ID, spatial relation information, and the like.

The UE may transmit the SRS in adjacent symbols as many as the SRS symbols out of last six symbols in one slot. Note that the number of SRS symbols may be one, two, four and the like.

The UE may switch a bandwidth part (BWP) to transmit the SRS for each slot, or may switch an antenna. Further, the UE may apply at least one of in-slot hopping and inter-slot hopping to the SRS transmission.

As the SRS transmission comb, interleaved frequency division multiple access (IFDMA) may be applied which uses Comb2 (in which the SRS is disposed every two resource elements (2 REs)) or Comb4 (in which the SRS is disposed every four REs), and a cyclic shift (CS).

The SRS spatial relation information (the RRC parameter "spatialRelationInfo") may indicate spatial relation information between a given reference signal (reference reference signal) and the SRS. The given reference signal may be at least one of a synchronization signal/physical broadcast channel (SS/PBCH) block, a channel state information reference signal (CSI-RS), and an SRS (e.g., another SRS). Here, the SS/PBCH block may be referred to as a synchronization signal block (SSB).

The SRS spatial relation information may include at least one of an SSB index, a CSI-RS resource ID, and an SRS resource ID, as the index of the given reference signal. Note that, in the present disclosure, an SSB index, an SSB resource ID, and an SSB resource indicator (SSBRI) may be replaced with each other. Further, a CSI-RS index, a CSI-RS resource ID, and a CSI-RS resource indicator (CRI) may be replaced with each other. Further, an SRS index, an SRS resource ID and an SRI may be replaced with each other.

The SRS spatial relation information may include a serving cell index, a BWP index (BWP ID), and the like corresponding to the given reference signal.

When spatial relation information about an SSB or CSI-RS and an SRS is configured on an SRS resource, the UE may transmit the SRS resource using the same spatial domain filter as a spatial domain filter for receiving the SSB or CSI-RS. That is, in this case, the UE may assume that a UE reception beam of the SSB or CSI-RS is the same as a UE transmission beam of the SRS.

When spatial relation information about another SRS (reference SRS) and the SRS (target SRS) is configured on an SRS (target SRS) resource, the UE may transmit the target SRS resource using the same spatial domain filter as a spatial domain filter for transmitting the reference SRS. That is, in this case, the UE may assume that a UE transmission beam of the reference SRS is the same as a UE transmission beam of the target SRS.

Note that a spatial domain filter for transmission of a base station, a downlink spatial domain transmission filter, and a transmission beam of the base station may be replaced with each other. The spatial domain filter for reception of the base station, the uplink spatial domain receive filter, and the reception beam of the base station may be replaced with each other.

Further, a spatial domain filter for transmission of the UE, an uplink spatial domain transmission filter, and a transmission beam of the UE may be replaced with each other. The spatial domain filter for reception of the UE, the downlink spatial domain receive filter, and the reception beam of the UE may be replaced with each other.

In this way, the UE can determine a spatial domain filter applied to the UL transmission (e.g., SRS transmission) based on the reference DL reference signal (CSI-RS, SSB) or UL reference signal (SRS) configured by the spatial relation information.

Incidentally, in beam transmission/reception between the base station and the UE, a transmission method using a beam may be properly controlled, depending on whether or not a beam (Tx BF) applied to transmission and a beam (Rx BF) applied to reception by the base station (or the UE) match.

If a beam applied to transmission and a beam applied to reception in the base station or the like match, the base station or the like may be said to have (support) beam correspondence. On the other hand, if a beam applied to transmission and a beam applied to reception do not match, the base station or the like may be said not to have (not to support) beam correspondence.

Matching of a beam applied to transmission and a beam applied to reception is not limited to a case of perfect matching, and includes a case of matching within a given allowable range. Note that beam correspondence may be referred to as transmission/reception beam correspondence (Tx/Rx beam correspondence), beam reciprocity, beam calibration, calibrated/non-calibrated, reciprocity calibrated/non-calibrated, a correspondence degree, a matching degree, simply correspondence, or the like.

If the beam correspondence exists, a beam applied to the transmission of a DL signal/channel at the base station matches a beam applied to the reception of a UL signal transmitted from the UE. Therefore, the base station can determine a beam suitable for transmission/reception to/from a UE by grasping a DL signal/channel (or a beam) having high reception characteristics (e.g., received power) at the UE. Note that the case of having beam correspondence may be read as the case of having reported that the UE supports beam correspondence.

For example, the base station transmits multiple synchronization signal blocks (SSBs) or CSI-RSs, using different DL resources (or DL beams) in the time direction. The UE may select a given SSB or CSI-RS based on the reception characteristics (for example, received power) and use the UL resource (or UL occasion, UL beam) associated with the given SSB or CSI-RS to transmit the UL signal or UL channel (for example, PRACH, etc.).

The base station performs reception processing on UL resources associated with each SSB or CSI-RS, and determines a given beam suitable for the DL and the UL based on the UL resource used for the transmission from the UE. Thus, if beam correspondence exists, a beam applied to the UL may be determined based on DL beam management.

On the other hand, if beam correspondence does not exist, a beam applied to transmission of a DL signal/channel at the base station does not match (link to) a beam applied to the reception of a UL signal/channel transmitted from the UE. The base station can determine a beam suitable for DL transmission by grasping a DL signal/channel having high reception characteristics (e.g., received power) at the UE by DL beam management.

The base station can determine a beam suitable for UL reception by grasping a UL signal/channel (or a beam) having high reception characteristics, of UL signals/channels transmitted from the UE, by UL beam management.

FIG. 1 is a diagram illustrating an example of UL beam management. More specifically, it is a diagram illustrating an example of beam forming control using an SRS. In this example, the UE is first instructed to transmit SRIs #0 to #3. The UE performs SRS transmission using transmission beams #0 to #3 for SRIs #0 to #3, respectively.

The base station may know in advance what beams transmission beams #0 to #3 are. The base station may measure uplink channels (or UL CSI) based on transmission beams #0 to #3.

For example, the base station may determine that the measurement result of transmission beam #2 (SRI #2) is the best, and then instruct the UE to transmit a beam using SRI #2. The UE may transmit an SRS using transmission beam #2 corresponding to SRI #2 based on the instruction. The base station can understand what beam the UE uses with which resource (SRI).

In this way, by configuring a plurality of SRS resources (or beams) in the UE and measuring the reception quality, it is possible to determine a beam suitable for UL. Note that the control in FIG. 1 may be performed on a plurality of UL beams of the UE and a plurality of DL beams of the base station. Further, the control in FIG. 1 may be performed regardless of whether or not the UE has beam correspondence.

The UE or the base station having beam correspondence may assume that transmission/reception beams match (or almost match). Note that beam correspondence may be referred to as beam reciprocity, beam calibration, simply correspondence, or the like.

A beam instruction for a PUCCH may be configured by higher layer signaling (PUCCH spatial relation information (PUCCH-Spatial-relation-info) of RRC). For example, if the PUCCH spatial relation information includes one spatial relation information (SpatialRelationInfo) parameter, the UE may apply the configured parameter to the PUCCH. If the PUCCH spatial relation information includes more than one spatial relation information parameter, a parameter applied to the PUCCH may be determined based on a MAC CE.

A beam instruction for a PUSCH may be determined based on an SRS resource indicator (SRI) field included in DCI.

As described above, when the base station notifies the UE of a spatial domain filter (spatial domain transmission filter) to be applied to UL transmission (for example, SRS transmission) by using spatial relation information, the UE is notified of a reference reference signal. The UE applies the same spatial domain filter as the spatial domain filter applied to the reference reference signal to perform UL transmission. The reference reference signal may be a DL reference signal (e.g., reference SSB or reference CSI-RS) or a UL reference signal (e.g., reference SRS).

In this case, whether the DL reference signal (or the reception beam corresponding to the DL reference signal) can be configured as the UL beam (spatial domain filter) in the UE that has not reported support for beam correspondence becomes a problem. If it cannot be configured, it is necessary to configure the beam (or UL reference signal resource) corresponding to the UL reference signal as the UL beam. On the other hand, if the DL reference signal can be configured, how to determine the UL beam becomes a problem.

Note that not reporting support for beam correspondence may be read as not reporting support for beam correspondence or reporting not supporting beam correspondence (not supported).

Further, when spatial relation information or the like is not notified (or configured), how to configure the spatial domain filter (or UL beam) applied to UL transmission becomes a problem. Alternatively, how to configure the spatial domain filter (or UL beam) applied to the PUSCH transmission scheduled by DCI that does not include an SRS resource identification field becomes a problem.

Therefore, the present inventors have conceived a UE operation that can appropriately determine the spatial domain filter (or UL beam) applied to UL transmission.

Hereinafter, embodiments according to the present disclosure will be described in detail with reference to the drawings. The configurations described in respective aspects may be applied individually or in combination. Further, in the following description, the case where the spatial domain filter to be applied to UL transmission is specified by the spatial relation information corresponding to the higher layer parameter is described, but it may be applied when the SRS resource (SRI) is specified by DCI.

Further, in the following description, various controls based on the presence/absence of support for beam correspondence (or the presence/absence of report indicating that beam correspondence is supported) may be read as presence/absence of support for given UL beam management (or presence/absence of report indicating that the given UL beam management is supported).

(First Aspect)

The first aspect controls a spatial domain filter (which may be referred to as a spatial domain transmission filter) configured in spatial relation information based on the presence or absence of support for beam correspondence or the presence or absence of a report indicating that beam correspondence is supported.

As the spatial domain filter configured in the spatial relation information, a plurality of spatial domain filters may be defined according to a reference signal, which is a reference. For example, the spatial domain filter configured in the spatial relation information may be any of a first spatial domain filter to a third spatial domain filter described below. Of course, the number of spatial domain filters configured in the spatial relation information and the reference signal, which is a reference, are not limited to the above.

<First Spatial Domain Filter>

The first spatial domain filter may be determined based on the SSB (or SS/PBCH block). For example, the base station may configure the spatial relation information including the ID of the reference SSB index in the UE in a higher layer.

When the spatial relation information including the ID of the reference SSB index is configured, the UE transmits a target UL resource using the same spatial domain filter as the spatial domain filter used to receive the reference SS/PBCH block. The target UL resource may be an SRS resource. Alternatively, the target UL resource may be at least one of a PUSCH resource and a PUCCH resource.

The reference SS/PBCH block may be, for example, the SS/PBCH block having the highest received power in DL beam management, or the SS/PBCH block selected based on a given rule.

<Second Spatial Domain Filter>

The second spatial domain filter may be determined based on CSI-RS. For example, the base station may configure the spatial relation information including the ID of the reference CSI-RS index in the UE in a higher layer.

When the spatial relation information including the ID of the reference CSI-RS index is configured, the UE transmits a target UL resource using the same spatial domain filter as the spatial domain filter used to receive the reference CSI-RS. The target UL resource may be an SRS resource. Alternatively, the target UL resource may be at least one of a PUSCH resource and a PUCCH resource.

The reference CSI-RS may be, for example, the CSI-RS having the highest received power in DL beam management, or the CSI-RS selected based on a given rule. Further, the reference CSI-RS may be a periodic CSI-RS or a semi-persistent CSI-RS.

<Third Spatial Domain Filter>

The third spatial domain filter may be determined based on SRS. For example, the base station may configure the spatial relation information including the ID of the reference SRS index in the UE in a higher layer.

When the spatial relation information including the ID of the reference SRS index is configured, the UE transmits a target UL resource using the same spatial domain filter as the spatial domain filter used to transmit the reference SRS. The target UL resource may be an SRS resource. Alternatively, the target UL resource may be at least one of a PUSCH resource and a PUCCH resource.

The reference SRS may be, for example, the SRS having the highest received power at the base station in UL beam management, or the SRS selected based on a given rule. Further, the reference SRS may be changed according to the target SRS. For example, if the target SRS is a periodic SRS, the reference SRS may be a periodic SRS. If the target SRS is a semi-persistent SRS, the reference SRS may be a periodic SRS or a semi-persistent SRS. If the target SRS is a semi-persistent aperiodic SRS, the reference SRS may be a periodic SRS, a semi-persistent SRS or an aperiodic SRS.

<Configuration of the Spatial Domain Filter>

Figure 2A:
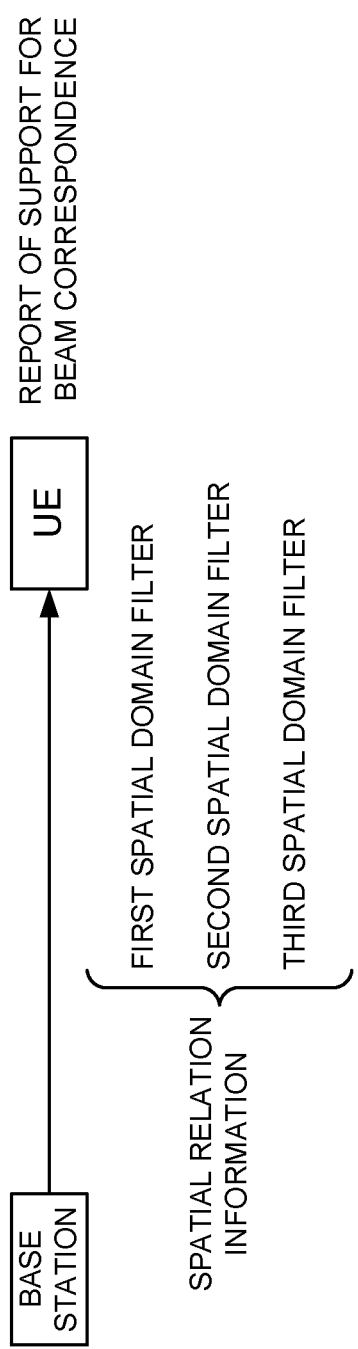
FIGS. 2A and 2B are diagrams illustrating an example of spatial relation information configured in the UE from a base station.

For example, the base station may configure one of the first spatial domain filter, the second spatial domain filter, and the third spatial domain filter for the UE that has reported that beam correspondence is supported (see FIG. 2A). That is, the UE that has reported that beam correspondence is supported (or the UE that supports beam correspondence) may assume that one of the first spatial domain filter to the third spatial domain filter is configured.

Figure 2B:
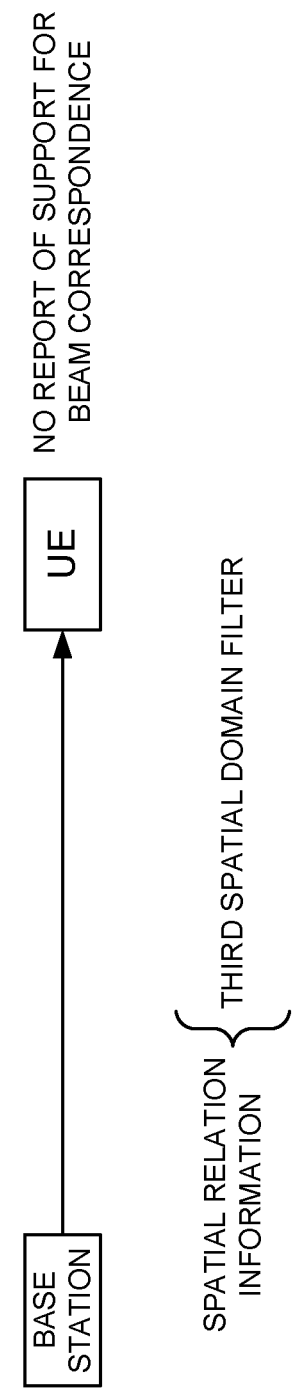

Further, the base station also configures the third spatial domain filter for the UE that has not reported that beam correspondence is supported (see FIG. 2B). In other words, it controls not to configure the first spatial domain filter and the second spatial domain filter. The UE that has not reported that beam correspondence is supported may be assumed that the first spatial domain filter and the second spatial domain filter are not configured.

The UE that has not reported that beam correspondence is supported may be read as the UE that does not support beam correspondence. Alternatively, the UE that has not reported that beam correspondence is supported may be read as the UE that has not reported UE capability information regarding beam correspondence regardless of the presence or absence of support for beam correspondence.

For the UE that does not support beam correspondence, by configuring the spatial domain filter corresponding to the UL reference signal without configuring the spatial domain filter corresponding to the DL reference signal (used to receive the DL reference signal), the UE can select the appropriate UL beam.

(Second Aspect)

The second aspect is described regarding the determination of the spatial domain filter in a case where the spatial domain filter corresponding to the DL reference signal and the UL reference signal can be configured in the spatial relation information regardless of the presence or absence of support for beam correspondence or the presence or absence of a report indicating that beam correspondence is supported.

That is, in the second aspect, one of the first spatial domain filter, the second spatial domain filter, and the third spatial domain filter is allowed to be configured by using the spatial relation information even for the UE that has not reported that beam correspondence is supported (see FIGS. 3A and 3B).

Figure 4:
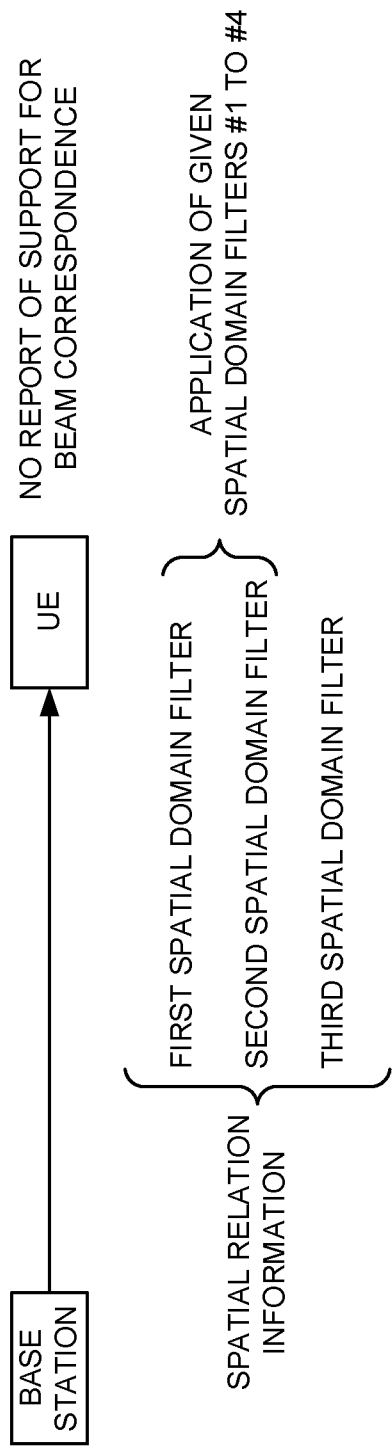
FIG. 4 is a diagram illustrating an example of a spatial domain filter applied by the UE.

However, if the first spatial domain filter and the second spatial domain filter are configured by the spatial relation information for the UE that has not reported that beam correspondence is supported, a given spatial domain filter may be applied to perform UL transmission (see FIG. 4). The UL transmission may be at least one of SRS transmission, PUSCH transmission, and PUCCH transmission.

The given spatial domain filter may be a spatial domain filter different from the spatial domain filter configured in the spatial relation information, and may be, for example, any of given spatial domain filters #1 to #4 described below.

<Given Spatial Domain Filter #1>

The UE may perform UL transmission by using the spatial domain filter used for random access channel (for example, PRACH) transmission as a given spatial domain filter.

For example, if the first spatial domain filter (or SSB index) or the second spatial domain filter (or CSI-RS index)

is configured in the spatial relation information, the UE ignores the configuration of the spatial relation information and selects the spatial domain filter used for PRACH transmission. The PRACH transmission may be the latest PRACH transmission or the lastly transmitted PRACH transmission. Alternatively, the PRACH transmission may be the latest PRACH transmission that has been successfully transmitted, or the lastly transmitted PRACH transmission.

In this way, by applying the spatial domain filter used for the PRACH transmission actually transmitted, it is possible to select an appropriate spatial domain filter as compared with the case of applying the spatial domain filter specified by the spatial relation information.

Further, by allowing the configuration of the DL reference signal other than the UL reference signal (e.g., SRS) as the spatial relation information with respect to the UE that does not support beam correspondence, it may be configured not to perform UL beam management (e.g., the operation in FIG. 1). This eliminates the need to configure UL beam management (for example, configuring multiple SRS resources and transmitting an SRS multiple times) to determine the UL beam. As a result, it becomes possible to improve the throughput.

Note that, here, the case of applying the spatial domain filter used for random access channel transmission is given as an example, but it is not limited thereto. The spatial domain filter applied in another latest UL transmission or the lastly transmitted UL transmission in place of the random access channel may be the given spatial domain filter #1. The other UL transmission may be PUSCH transmission, PUCCH transmission, or SRS transmission.

<Given Spatial Domain Filter #2>

The UE may perform UL transmission by using the spatial domain filter used to receive the DL reference signal corresponding to random access channel (for example, PRACH) transmission as a given spatial domain filter. The DL reference signal may be an SSB or a CSI-RS.

For example, when the first spatial domain filter or the second spatial domain filter is configured in the spatial relation information, the UE may ignore the configuration of the spatial relation information and select the spatial domain filter used to receive the DL reference signal corresponding to the PRACH transmission. The PRACH transmission may be the latest PRACH transmission or the lastly transmitted PRACH transmission. Alternatively, the PRACH transmission may be the latest PRACH transmission that has been successfully transmitted, or the lastly transmitted PRACH transmission.

The DL reference signal corresponding to the PRACH transmission may be a DL reference signal associated with the PRACH transmission. For example, in DL beam management, among a plurality of DL reference signals transmitted, the DL reference signal associated with the PRACH transmitted by the UE (for example, the one having the highest received power) may be used. Alternatively, the DL reference signal corresponding to the PRACH transmission may be a DL reference signal configured in relation to the DL signal (for example, message 2 or the like) transmitted from the base station in response to the PRACH transmission from the UE.

In this way, by applying the spatial domain filter used to receive the DL reference signal corresponding to the PRACH transmission actually transmitted, it is possible to select an appropriate spatial domain filter as compared with the case of applying the spatial domain filter specified by the spatial relation information.

Further, by allowing the configuration of the DL reference signal other than the UL reference signal (e.g., SRS) as the spatial relation information with respect to the UE that does not support beam correspondence, it may be configured not to perform UL beam management (e.g., the operation in FIG. 1). This eliminates the need to configure UL beam management (for example, configuring multiple SRS resources and transmitting an SRS multiple times) to determine the UL beam. As a result, it becomes possible to improve the throughput.

<Given Spatial Domain Filter #3>

The UE may perform UL transmission by using a spatial domain filter corresponding to a resource of a given uplink control channel as a given spatial domain filter. For example, the UE may apply a spatial domain filter corresponding to a certain PUCCH resource (PUCCH resource with the lowest index (ID) in active UL BWP).

The spatial domain filter applied to a certain PUCCH resource may be determined based on the spatial relation information for PUCCH configured in the higher layer. As spatial relation information for PUCCH, a spatial domain filter corresponding to a reference DL reference signal (for example, SSB or CSI-RS) and a spatial domain filter corresponding to a reference UL reference signal (for example, SRS) may be configured.

When a spatial domain filter corresponding to a UL reference signal (for example, SRS) is configured as a spatial domain filter corresponding to a certain PUCCH resource, the UE uses the spatial domain filter to perform UL transmission (for example, PUSCH transmission). On the other hand, when a spatial domain filter corresponding to a DL reference signal (for example, SRS) is configured as a spatial domain filter corresponding to a certain PUCCH resource, another spatial domain filter may be applied. The other spatial domain filter may be any of the given spatial domain filters #1, #2, and #4.

<Given Spatial Domain Filter #4>

The UE may autonomously perform selection on the UE side as a given spatial domain filter (UE implementation). For example, the same UL panel as the spatial domain filter used for PRACH transmission may be applied.

Note that the second aspect may be configured to be selectively applied in a given frequency domain (for example, FR2) and not applied in another frequency domain (for example, FR1). FR1 may be a frequency range of 6 GHz or less (sub-6 GHz), and FR2 may be a frequency range higher than 24 GHz (above-24 GHz). Alternatively, the second aspect may be configured to be applied in an environment in which a spatial domain filter is configured.

(Third Aspect)

In the third aspect, the UE controls UL transmission (at least one of PUSCH, PUCCH, and SRS) by utilizing a given spatial domain filter when spatial relation information is not configured. The spatial relation information may be at least one of the spatial relation information for SRS and the spatial relation information for PUCCH.

Further, the third aspect may be applied not only to the UE that has not reported that beam correspondence is supported, but also to the UE that has reported that beam correspondence is supported.

Figure 5:
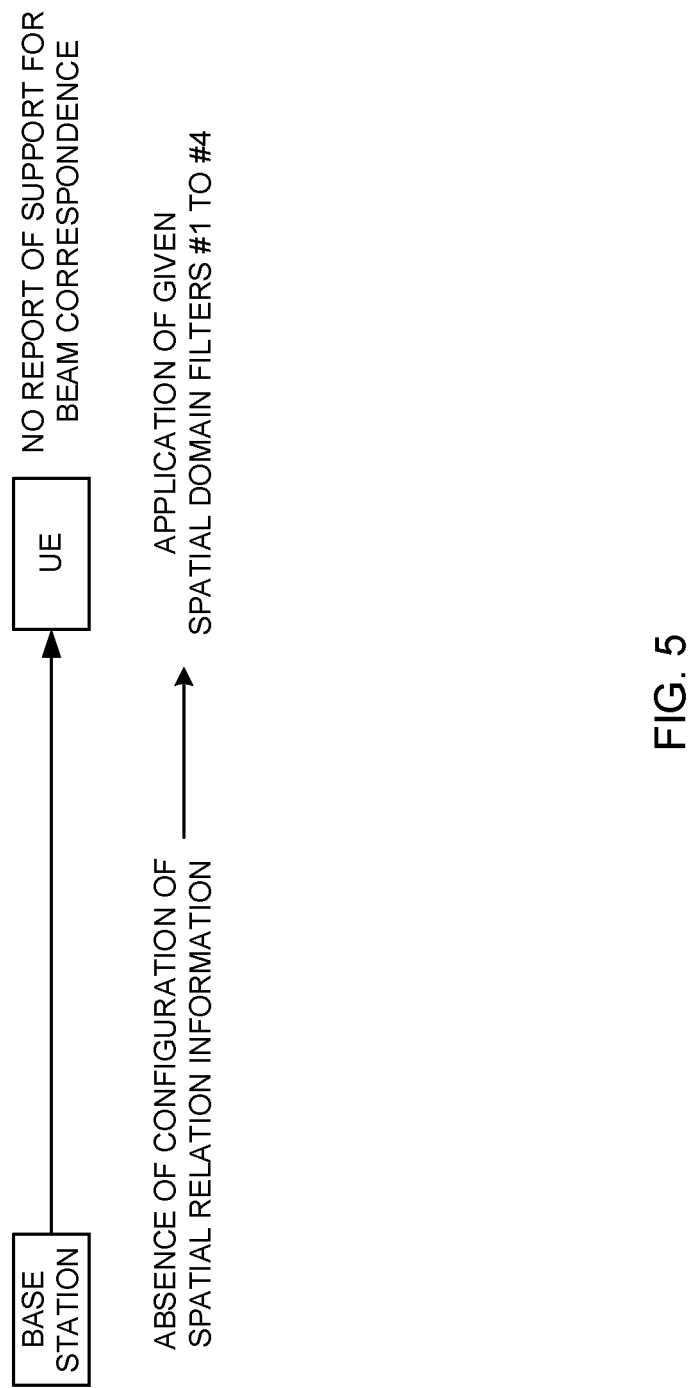
FIG. 5 is a diagram illustrating another example of a spatial domain filter applied by the UE.

The UE for which the spatial relation information is not configured applies the given spatial domain filter to control UL transmission (see FIG. 5). For example, the UE may control UL transmission by applying any of the given spatial domain filters #1 to #4 described in the second aspect. In this case, the UE applies a preset given spatial domain filter on the assumption that the spatial relation information (spatial domain filter) is not configured when there is no notification of the spatial relation information.

Thus, even if the spatial relation information is not configured (or cannot be received), the UE can select an appropriate UL beam (spatial domain filter) and perform UL transmission.

Note that the third aspect may be configured to be selectively applied in a given frequency domain (for example, FR2) and not applied in another frequency domain (for example, FR1). FR1 may be a frequency range of 6 GHz or less (sub-6 GHz), and FR2 may be a frequency range higher than 24 GHz (above-24 GHz). Alternatively, the third aspect may be configured to be applied in an environment in which a spatial domain filter is configured.

(Fourth Aspect)

In the fourth aspect, when PUSCH transmission is scheduled in a DCI format that does not include the SRS resource identification field used to determine the PUSCH transmission beam (spatial domain filter), the UE utilizes a given spatial domain filter to control PUSCH transmission. The SRS resource identification field may be referred to as the SRS resource index field.

Further, the fourth aspect may be applied not only to the UE that has not reported that beam correspondence is supported, but also to the UE that has reported that beam correspondence is supported.

Figure 6:
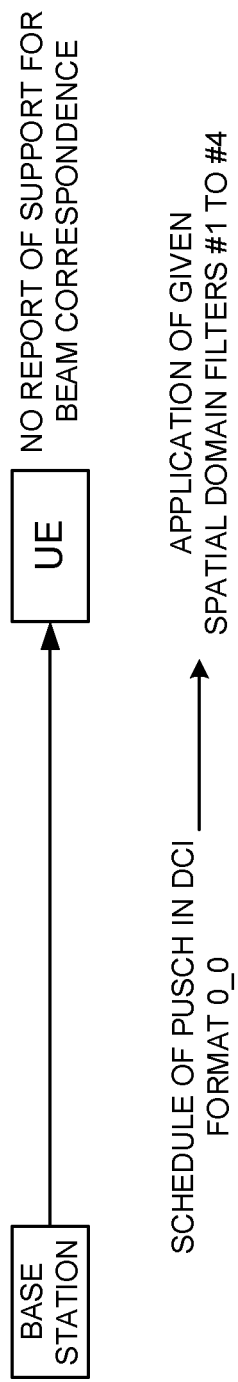
FIG. 6 is a diagram illustrating another example of a spatial domain filter applied by the UE.

When the PUSCH is scheduled in a DCI format that does not include the SRS resource identification field (for example, DCI format 0_0), the UE applies a given spatial domain filter to control UL transmission (see FIG. 6). For example, the UE may control UL transmission by applying any of the given spatial domain filters #1 to #4 described in the second aspect.

This allows the UE to select an appropriate UL beam (spatial domain filter) to perform UL transmission even if the DCI scheduling the PUSCH does not include the SRS resource index.

Note that the fourth aspect may be configured to be selectively applied in a given frequency domain (for example, FR2) and not applied in another frequency domain (for example, FR1). FR1 may be a frequency range of 6 GHz or less (sub-6 GHz), and FR2 may be a frequency range higher than 24 GHz (above-24 GHz). Alternatively, the fourth aspect may be configured to be applied in an environment in which a spatial domain filter is configured.

(Fifth Aspect)

In the fifth aspect, the UE controls UL transmission (for example, at least one of PUSCH transmission, PUCCH transmission and SRS transmission) by using a given spatial domain filter when the usage of an SRS is a codebook or non-codebook and when the SRS resource corresponding to the codebook or non-codebook is not configured.

The base station configures the usage of the SRS in the UE by using the higher layer signaling (for example, higher layer parameter usage). The usage of the SRS may be at least one of beam management (beamManagement), codebook (codebook), non-codebook (nonCodebook), and antenna switching (antennaSwitching).

When codebook or non-codebook is configured as the usage of the SRS, the UE is configured with an SRS resource (or an SRS resource set) from the base station. The SRS resource may be configured by at least one of DCI and higher layer signaling.

On the other hand, there may be a case where the SRS resource is not configured when the codebook or non-codebook is configured as the usage of the SRS. In this case, the UE for which the SRS resource is not configured may apply a given spatial domain filter to control UL transmission. For example, the UE may control UL transmission by applying any of the given spatial domain filters #1 to #4 described in the second aspect.

For example, the UE applies a preset given spatial domain filter when codebook or non-codebook is configured as the usage of the SRS and there is no notification of the SRS resource. Thus, even if the SRS resource is not configured (or cannot be received), the UE can select an appropriate UL beam (spatial domain filter) and perform UL transmission.

Note that the fifth aspect may be configured to be selectively applied in a given frequency domain (for example, FR2) and not applied in another frequency domain (for example, FR1). FR1 may be a frequency range of 6 GHz or less (sub-6 GHz), and FR2 may be a frequency range higher than 24 GHz (above-24 GHz). Alternatively, the fifth aspect may be configured to be applied in an environment in which a spatial domain filter is configured.

(Radio Communication System)

A configuration of a radio communication system according to one embodiment of the present disclosure is hereinafter described. In this radio communication system, communication is performed using one or a combination of the radio communication methods according to the embodiments of the present disclosure.

Figure 7:
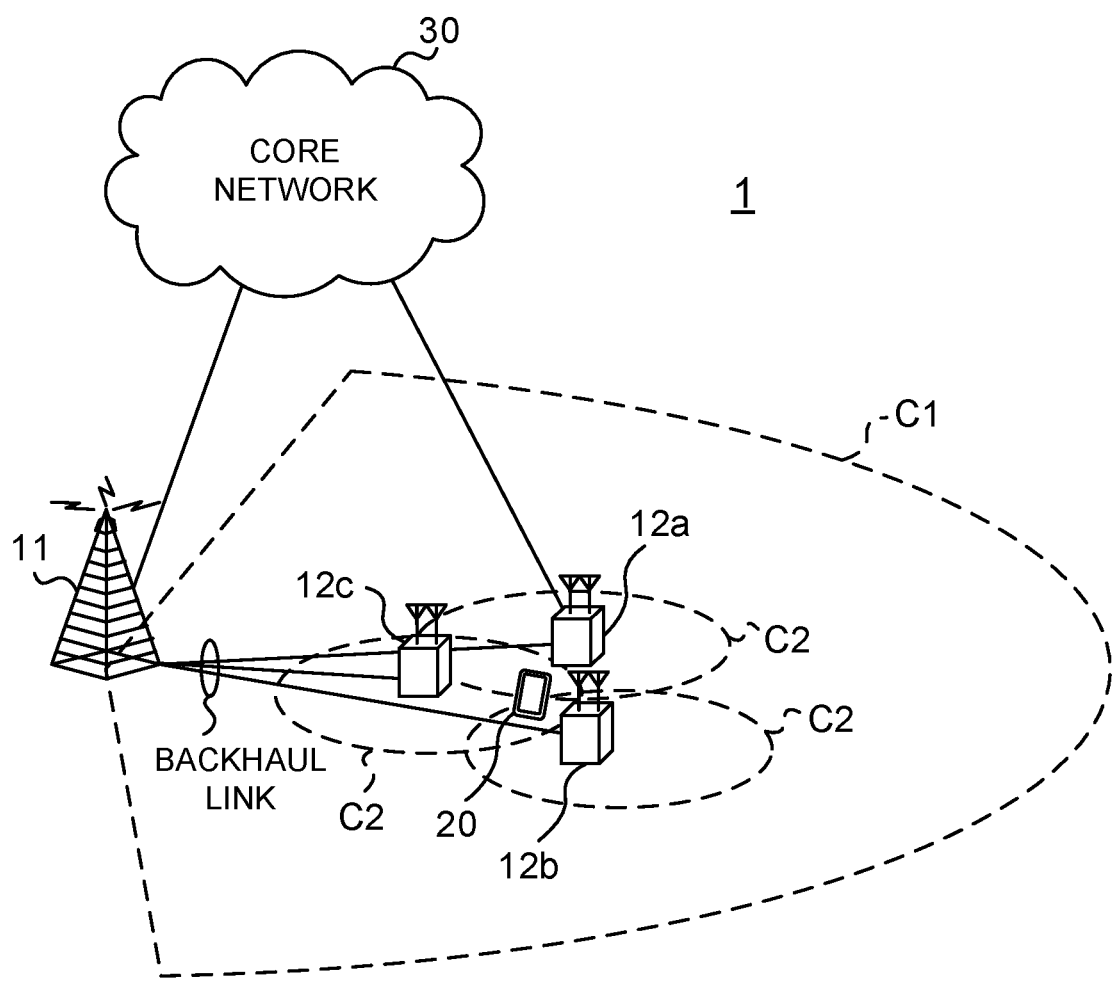
FIG. 7 is a diagram illustrating an example of a schematic configuration of a radio communication system according to one embodiment.

FIG. 7 is a diagram illustrating an example of a schematic configuration of a radio communication system according to one embodiment. A radio communication system 1 may be a system that implements communication using long term evolution (LTE), 5th generation mobile communication system new radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In EN-DC, an LTE (E-UTRA) base station (eNB) is a master node (MN), and an NR base station (gNB) is a secondary node (SN). In NE-DC, an NR base station (gNB) is MN, and an LTE (E-UTRA) base station (eNB) is SN.

The radio communication system 1 may support dual connectivity between a plurality of base stations in a single RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. User terminal 20 may be located in at least one cell. The arrangement, number, and the like of cells and the user terminal 20 are not limited to the aspects illustrated in the drawings. Hereinafter the base stations 11 and 12 will be collectively referred to as base stations 10 unless specified otherwise.

The user terminal 20 may be connected to at least one of the plurality of base stations 10. The user terminal 20 may use at least one of carrier aggregation and dual connectivity (DC) using a plurality of component carriers (CC).

Each CC may be included in at least one of a frequency range 1 (FR1) and a frequency range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of FR1 and FR2 are not limited to these, and, for example, FR1 may correspond to a frequency range higher than FR2.

Further, the user terminal 20 may perform communication in each CC using at least one of time division duplex (TDD) and frequency division duplex (FDD).

The plurality of base stations 10 may be connected by wire (for example, an optical fiber or an X2 interface in compliance with common public radio interface (CPRI)) or wirelessly (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of evolved packet core (EPC), 5G core network (5GCN), next generation core (NGC), and the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH) shared by each user terminal 20, a physical broadcast channel (PBCH), a physical downlink control channel (PDCCH), or the like may be used.

Further, in the radio communication system 1, as an uplink channel, a physical uplink shared channel (PUSCH) shared by each user terminal 20, a physical uplink control channel (PUCCH), a physical random access channel (PRACH), or the like may be used.

User data, higher layer control information, and a system information block (SIB) and the like are transmitted by the PDSCH. The PUSCH may transmit user data, higher layer control information, and the like. Further, the PBCH may transmit a master information block (MIB).

The PDCCH may transmit lower layer control information. The lower layer control information may include, for example, downlink control information (DCI) including scheduling information of at least one of the PDSCH and the PUSCH.

Note that DCI that schedules the PDSCH may be referred to as DL assignment, DL DCI, or the like, and DCI that schedules the PUSCH may be referred to as UL grant, UL DCI, or the like. Note that the PDSCH may be replaced with DL data, and the PUSCH may be replaced with UL data.

A control resource set (CORESET) and a search space may be used to detect the PDCCH. The CORESET corresponds to a resource that searches for DCI. The search space corresponds to a search area and a search method for PDCCH candidates. One CORESET may be associated with one or more search spaces. The UE may monitor the CORESET associated with a certain search space based on search space configuration.

One SS may correspond to a PDCCH candidate corresponding to one or more aggregation levels. One or more search spaces may be referred to as a search space set. Note that "search space", "search space set", "search space configuration", "search space set configuration", "CORESET", "CORESET configuration", and the like in the present disclosure may be replaced with each other.

By means of the PUCCH, channel state information (CSI), delivery acknowledgement information (for example, hybrid automatic repeat request (HARQ-ACK), which may be referred to as ACK/NACK or the like), scheduling request (SR), and the like may be transmitted. By means of the PRACH, a random access preamble for establishing a connection with a cell may be transmitted.

Note that in the present disclosure, downlink, uplink, and the like may be expressed without "link". Further, various channels may be expressed without adding "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as the DL-RS.

The synchronization signal may be, for example, at least one of a primary synchronization signal (PSS) and a secondary synchronization signal (SSS). A signal block including SS (PSS or SSS) and PBCH (and DMRS for PBCH) may be referred to as an SS/PBCH block, an SSB (SS Block), and the like. Note that the SS, the SSB, or the like may also be referred to as a reference signal.

Further, in the radio communication system 1, a sounding reference signal (SRS), a demodulation reference signal (DMRS), and the like may be transmitted as an uplink reference signal (UL-RS). Note that, the DMRS may be referred to as a "user terminal-specific reference signal (UE-specific Reference Signal)".

(Base Station)

Figure 8:
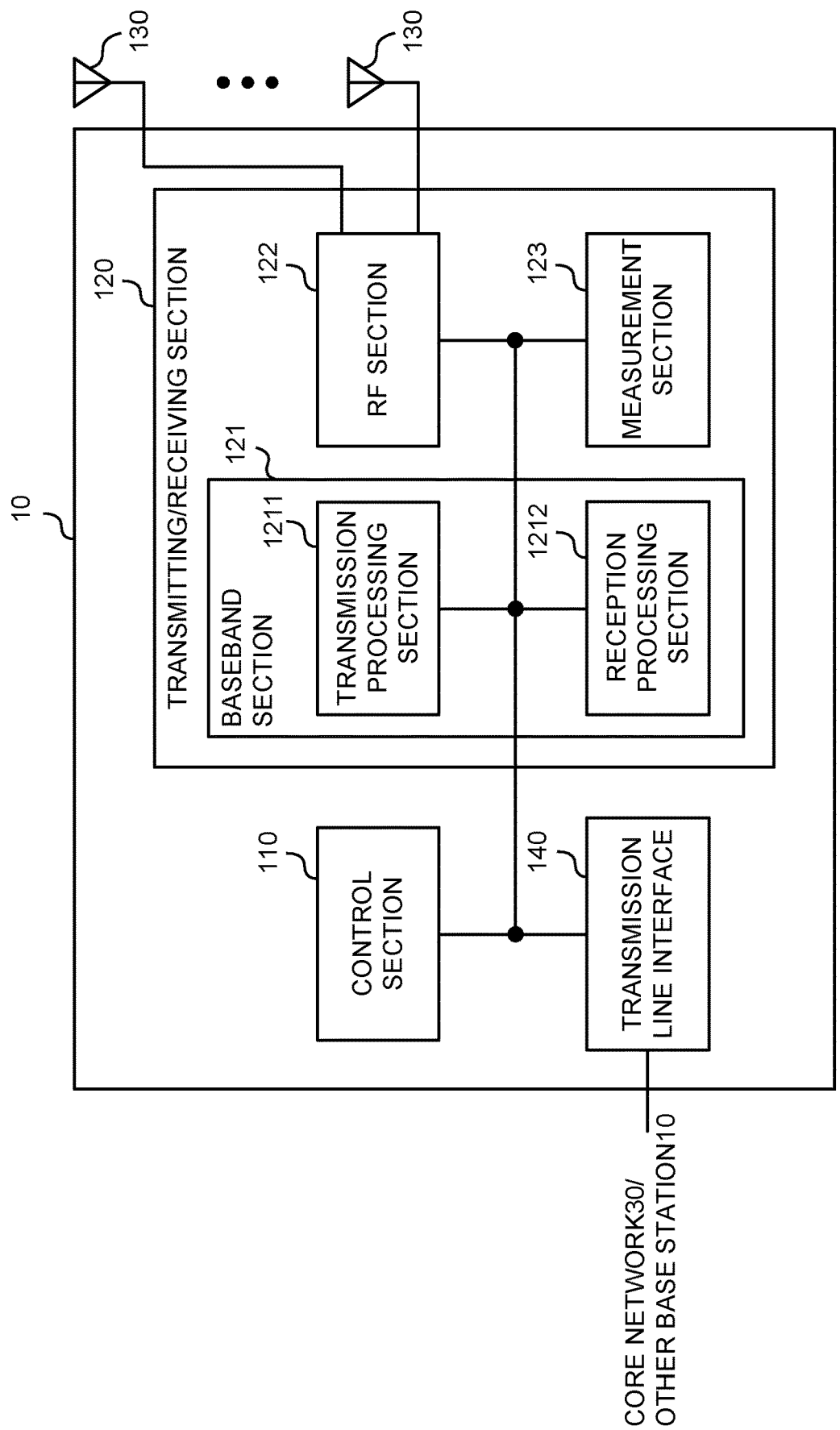
FIG. 8 is a diagram illustrating an example of a functional configuration of the base station according to one embodiment.

FIG. 8 is a diagram illustrating an example of a configuration of a base station according to one embodiment. The base station 10 includes a control section 110, a transmitting/receiving section 120, a transmission/reception antenna 130, and a transmission line interface 140. Note that one or more of the control sections 110, one or more of the transmitting/receiving sections 120, one or more of the transmission/reception antennas 130, and one or more of the transmission line interfaces 140 may be included.

Note that, although this example primarily indicates functional blocks of characteristic parts of the present embodiment, it may be assumed that the base station 10 has other functional blocks that are necessary for radio communication as well. A part of processing of each section described below may be omitted.

The control section 110 controls the entire base station 10. The control section 110 can be constituted by a controller, a control circuit, or the like, which is described based on common recognition in the technical field to which the present disclosure relates.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may transfer the data, the control information, the sequence, and the like to the transmitting/receiving section 120. The control section 110 may perform call processing (such as configuration or release) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmitting/receiving section 120 may be constituted as an integrated transmitting/receiving section, or may be constituted by a transmitting section and a receiving section. The transmitting section may be constituted by the transmission processing section 1211 and the RF section 122. The receiving section may be constituted by the reception processing section 1212, the RF section 122, and the measurement section 123.

The transmission/reception antenna 130 can be constituted by an antenna described based on common recognition in the technical field to which the present disclosure relates, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam and a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data or control information acquired from the control section 110 to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog transform on the bit string to be transmitted, and may output a baseband signal.

The transmitting/receiving section 120 (RF section 122) may perform modulation to a radio frequency band, filtering processing, amplification, and the like on the baseband signal, and may transmit a signal in the radio frequency band via the transmission/reception antenna 130.

Meanwhile, the transmitting/receiving section 120 (RF section 122) may perform amplification, filtering processing, demodulation to a baseband signal, and the like on the signal in the radio frequency band received by the transmission/reception antenna 130.

The transmitting/receiving section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 120 (measurement section 123) may perform measurement on the received signal. For example, the measurement section 123 may perform radio resource management (RRM) measurement, channel state information (CSI) measurement, and the like based on the received signal. The measurement section 123 may measure received power (for example, reference signal received power (RSRP)), received quality (for example, reference signal received quality (RSRQ), signal to interference plus noise ratio (SINR), or signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, other base stations 10, and the like, and may acquire, transmit, and the like user data (user plane data), control plane data, and the like for the user terminal 20.

Note that the transmitting section and the receiving section of the base station 10 in the present disclosure may be constituted by at least one of the transmitting/receiving section 120, the transmission/reception antenna 130, and the transmission line interface 140.

Note that the transmitting/receiving section 120 may transmit the spatial relation information including information regarding the ID of the reference reference signal used for determining the spatial domain filter applied to UL transmission. The transmitting/receiving section 120 receives the UL transmission (for example, at least one of PUSCH, PUCCH, and SRS) to which a given spatial domain filter has been applied.

The control section 110 may perform control to configure a given spatial domain filter to be used for UL transmission based on at least one of the presence/absence of report regarding support for beam correspondence, the presence/absence of configuration of spatial relation information, and the type of downlink control information for scheduling the UL transmission.

(User Terminal)

Figure 9:
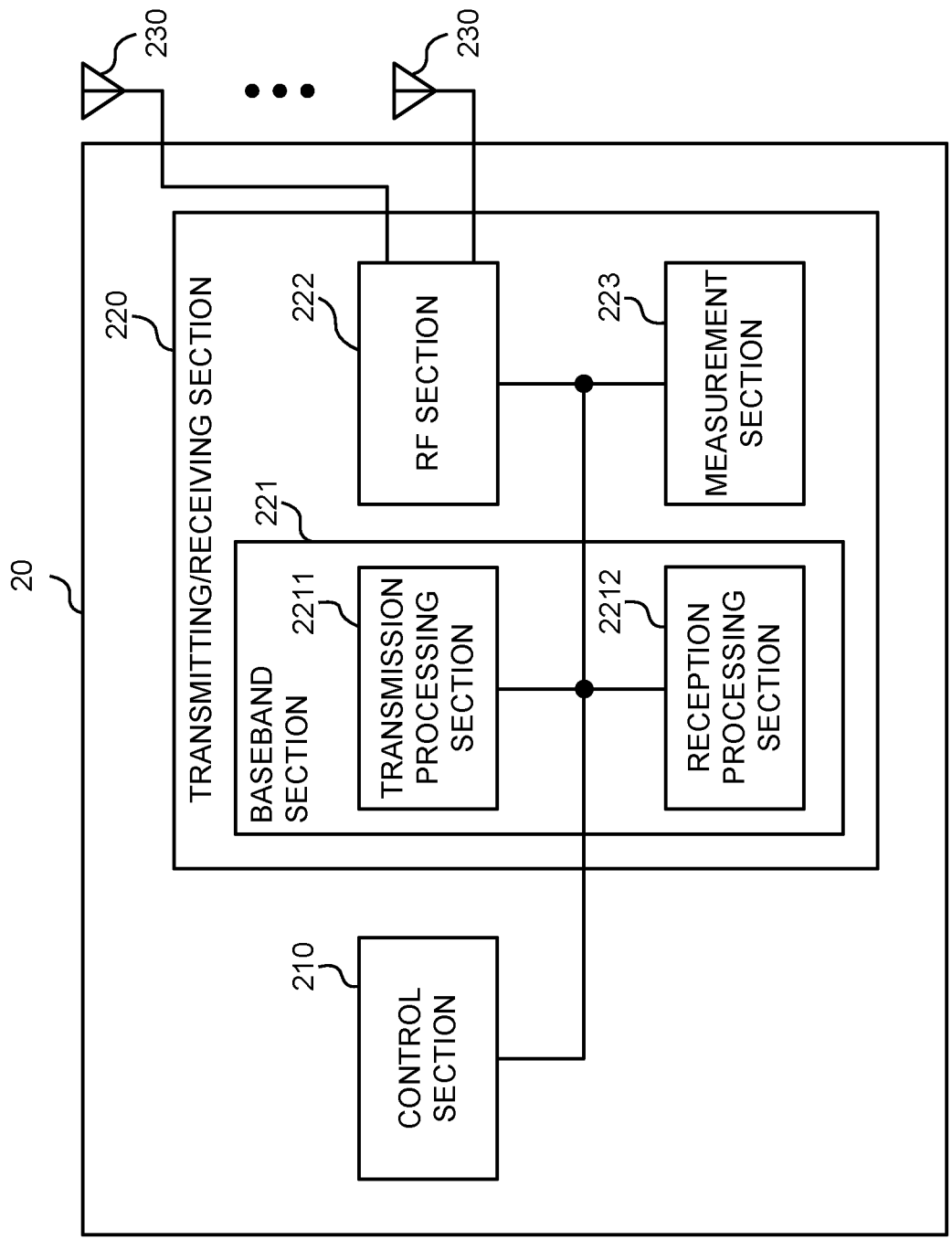
FIG. 9 is a diagram illustrating an example of a functional configuration of the user terminal according to one embodiment.

FIG. 9 is a diagram illustrating an example of a configuration of user terminal according to one embodiment. The user terminal 20 includes a control section 210, a transmitting/receiving section 220, and a transmission/reception antenna 230. Note that one or more of the control sections 210, one or more of the transmitting/receiving sections 220, and one or more of the transmission/reception antennas 230 may be included.

Note that, although this example mainly describes a functional block which is a characteristic part of the present embodiment, it may be assumed that the user terminal 20 also has another functional block necessary for radio communication. A part of processing of each section described below may be omitted.

The control section 210 controls the entire user terminal 20. The control section 210 can be constituted by a controller, a control circuit, or the like, which is described based on common recognition in the technical field to which the present disclosure relates.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmitting/receiving section 220 may be constituted as an integrated transmitting/receiving section, or may be constituted by a transmitting section and a receiving section. The transmitting section may be constituted by the transmission processing section 2211 and the RF section 222. The receiving section may be constituted by the reception processing section 2212, the RF section 222, and the measurement section 223.

The transmission/reception antenna 230 can be constituted by an antenna described based on common recognition in the technical field to which the present disclosure relates, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like, for example, on data or control information acquired from the control section 210 to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog transform on a bit string to be transmitted, and may output a baseband signal.

Note that whether or not to apply DFT processing may be based on configuration of transform precoding. When transform precoding is enabled for a channel (for example, PUSCH), the transmitting/receiving section 220 (transmission processing section 2211) may perform DFT processing as the transmission processing in order to transmit the channel using a DFT-s-OFDM waveform. When it is not the case, DFT processing need not be performed as the transmission processing.

The transmitting/receiving section 220 (RF section 222) may perform modulation to a radio frequency band, filtering processing, amplification, and the like on the baseband signal, and may transmit a signal in the radio frequency band via the transmission/reception antenna 230.

Meanwhile, the transmitting/receiving section 220 (RF section 222) may perform amplification, filtering processing, demodulation to a baseband signal, and the like on the signal in the radio frequency band received by the transmission/reception antenna 230.

The transmitting/receiving section 220 (reception processing section 2212) may acquire user data and the like by applying reception processing such as analog-digital transform, FFT processing, IDFT processing (if necessary), filtering processing, demapping, demodulation, decoding (which may include error correction decoding), MAC layer processing, RLC layer processing, or PDCP layer processing on the acquired baseband signal.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may be constituted by at least one of the transmitting/receiving section 220, the transmission/reception antenna 230, and the transmission line interface 240.

Note that the transmitting/receiving section 220 performs UL transmission using a given spatial domain filter. Further, the transmitting/receiving section 220 receives the spatial relation information including information regarding the reference reference signal used for selecting the spatial domain filter.

The control section 210 controls determination of a given spatial domain filter to be used for UL transmission based on at least one of the presence/absence of report regarding support for beam correspondence, the presence/absence of configuration of spatial relation information, and the type of downlink control information for scheduling the UL transmission.

At least one of the number and types of spatial domain filters that can be configured in the spatial relation information may be different depending on the presence or absence of report regarding support for beam correspondence (or presence or absence of report indicating that beam correspondence is supported, presence or absence of support for beam correspondence).

When the control section 210 has not reported that beam correspondence is supported and when the index of the DL reference signal is configured as the reference reference signal in the spatial relation information, a certain spatial domain filter may be applied.

The control section 210 may apply a certain spatial domain filter when spatial relation information is not configured.

The control section 210 may apply a certain spatial domain filter when UL transmission is scheduled by downlink control information that does not include the indication field of the sounding reference signal resource.

The certain spatial domain filter may be predefined in the specification or may be pre-configured from the base station to the UE. For example, the certain spatial domain filter may be at least one of a spatial domain filter used to transmit a random access channel, a spatial domain filter used to receive the DL reference signal corresponding to the transmission of a random access channel, and a spatial domain filter corresponding to a given uplink control channel.

(Hardware Configuration)

Note that the block diagrams that have been used to describe the above embodiments illustrate blocks in functional units. These functional blocks (configuration units) may be implemented in arbitrary combinations of at least one of hardware or software. Further, the method for implementing each functional block is not certainly limited. That is, each functional block may be implemented by a single apparatus physically or logically aggregated, or may be implemented by directly or indirectly connecting two or more physically or logically separate apparatuses (using wires, radio, or the like, for example) and using these plural apparatuses. The functional blocks may be implemented by combining software with the above-described single apparatus or the above-described plurality of apparatuses.

Here, the function includes, but is not limited to, deciding, determining, judging, calculating, computing, processing, deriving, investigating, searching, ascertaining, receiving, transmitting, outputting, accessing, solving, selecting, choosing, establishing, comparing, assuming, expecting, considering, broadcasting, notifying, communicating, forwarding, configuring, reconfiguring, allocating, mapping, and assigning. For example, a functional block (configuration unit) that causes transmission to function may be called as a transmitting unit, a transmitter and the like. In any case, as described above, the implementation method is not certainly limited.

Figure 10:
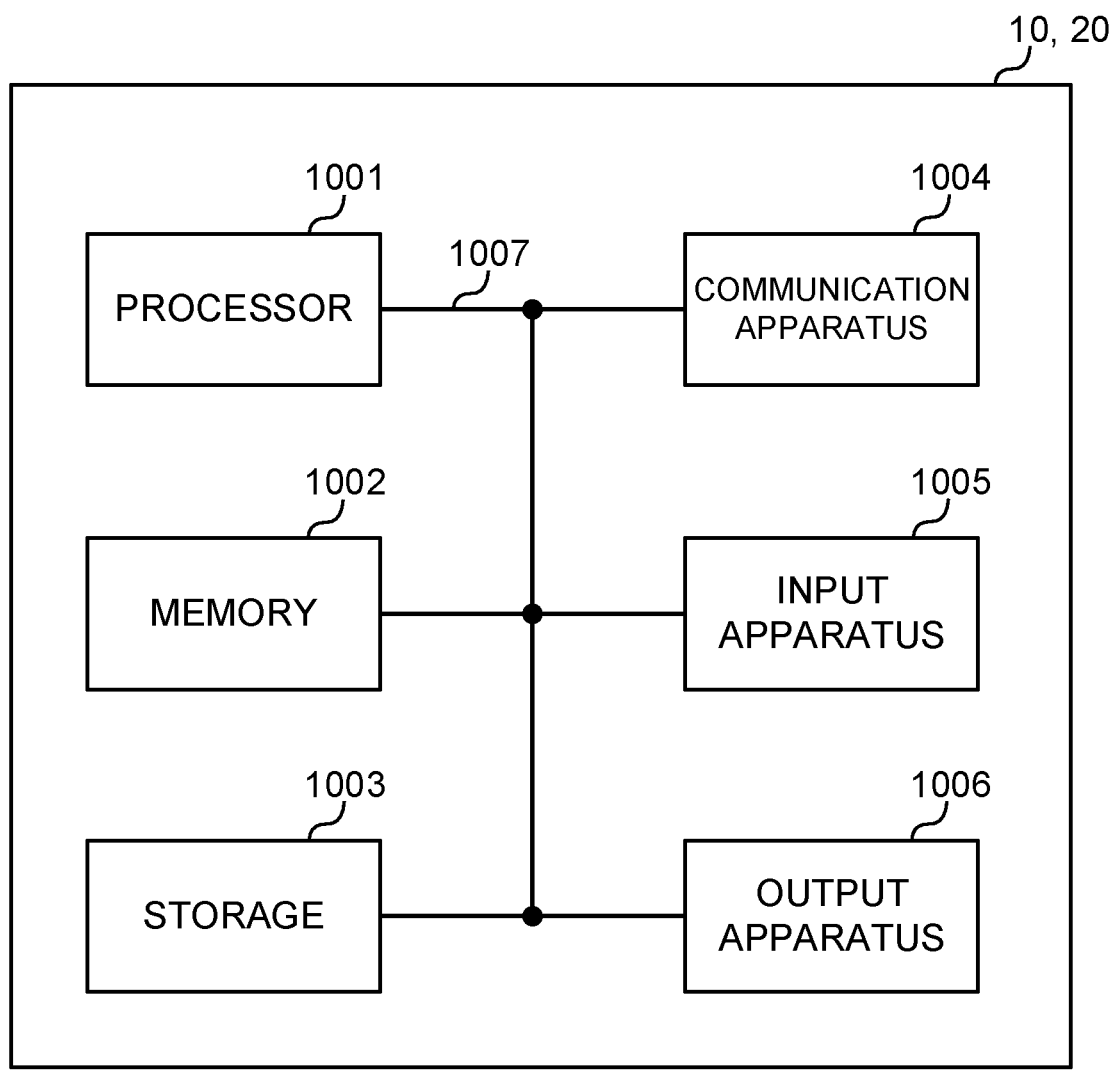
FIG. 10 is a diagram illustrating an example of a hardware configuration of the base station and the user terminal according to one embodiment.

For example, the base station, the user terminal, and the like according to one embodiment of the present disclosure may function as a computer that executes the processing of the radio communication method of the present disclosure. FIG. 10 is a diagram illustrating an example of a hardware configuration of the base station and the user terminal according to one embodiment. Physically, the above-described base station 10 and user terminal 20 may be configured as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, or a unit can be replaced with each other. The hardware configuration of the base station 10 and the user terminal 20 may include one or more apparatuses illustrated in the drawing, or does not have to include some apparatuses.

For example, although only one processor 1001 is illustrated, a plurality of processors may be included. Further, the processing may be executed by one processor, or the processing may be executed in sequence, or in different manners, by two or more processors. Note that the processor 1001 may be implemented by one or more chips.

Each of functions of the base station 10 and the user terminal 20 is implemented by causing given software (program) to be read on hardware such as the processor 1001 or the memory 1002, thereby causing the processor 1001 to perform operation, controlling communication via the communication apparatus 1004, and controlling at least one of reading and writing of data in the memory 1002 and the storage 1003.

The processor 1001 controls the whole computer, for example, by operating an operating system. The processor 1001 may be configured by a central processing unit (CPU) including an interface with peripheral equipment, a control apparatus, an operation apparatus, a register, and the like. For example, at least a part of the above-described control section 110(210), transmitting/receiving section 120(220), and the like may be implemented by the processor 1001.

Further, the processor 1001 reads a program (program code), a software module, data, and the like from at least one of the storage 1003 and the communication apparatus 1004 into the memory 1002, and executes various types of processing according to these. As the program, a program to cause a computer to execute at least a part of the operation described in the above-described embodiment is used. For example, the control section 110(210) may be implemented by a control program that is stored in the memory 1002 and operates in the processor 1001, and another functional block may be implemented similarly.

The memory 1002 is a computer-readable recording medium, and may be configured by, for example, at least one of read only memory (ROM), erasable programmable ROM (EPROM), electrically EPROM (EEPROM), random access memory (RAM), and other appropriate storage media. The memory 1002 may be referred to as a register, a cache, a main memory (primary storage apparatus), and the like. The memory 1002 can store, for example, a program (program code) that can be executed for performing a radio communication method according to one embodiment of the present disclosure or a software module.

The storage 1003 is a computer-readable recording medium, and may be configured by, for example, at least one of a flexible disk, a floppy (registered trademark) disk, a magneto-optical disk (for example, a compact disc (compact disc ROM (CD-ROM)), a digital versatile disc, a Blu-ray (registered trademark) disk), a removable disk, a hard disk drive, a smart card, a flash memory device (for example, a card, a stick, or a key drive), a magnetic stripe, a database, a server, and other appropriate storage media. The storage 1003 may be referred to as an auxiliary storage apparatus.

The communication apparatus 1004 is hardware (transmission/reception device) for performing inter-computer communication via at least one of a wired network and a radio network, and is referred to as, for example, network device, network controller, network card, or communication module. The communication apparatus 1004 may be configured by a high frequency switch, a duplexer, a filter, a frequency synthesizer, and the like in order to implement, for example, at least one of frequency division duplex (FDD) and time division duplex (TDD). For example, the transmitting/receiving section 120(220), the transmission/reception antenna 130(230), and the like described above may be implemented by the communication apparatus 1004. The transmitting/receiving section 120(220) may be implemented by physically or logically separating a transmitting section 120a(220a) and a receiving section 120b(220b) from each other.

The input apparatus 1005 is an input device that receives input from the outside (for example, a keyboard, a mouse, a microphone, a switch, a button, or a sensor). The output apparatus 1006 is an output device for performing outputting to the outside (for example, a display, a speaker, a light emitting diode (LED) lamp, and the like). Note that the input apparatus 1005 and the output apparatus 1006 may be integrated with each other (for example, a touch panel).

Further, the apparatuses such as the processor 1001 and the memory 1002 are connected by the bus 1007 for communicating information. The bus 1007 may be configured by a single bus, or may be configured by buses that vary between apparatuses.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by the hardware. For example, the processor 1001 may be implemented using at least one of these pieces of hardware.

(Modification)

Note that terms described in the present disclosure and terms necessary for understanding the present disclosure may be replaced with other terms that have the same or similar meanings. For example, a channel, a symbol, and a signal (or signaling) may be replaced with each other. Further, the signal may be a message. The reference signal can be abbreviated as an RS (reference signal), and may be referred to as a pilot, a pilot signal and the like, depending on which standard applies. Further, a component carrier (CC) may be referred to as a cell, a frequency carrier, a carrier frequency, or the like.

A radio frame may be constituted by one or more periods (frames) in a time domain. Each of one or more periods (frames) constituting a radio frame may be referred to as a subframe. Furthermore, a subframe may be constituted by one or more slots in the time domain. The subframe may be a fixed time length (for example, 1 ms) not dependent on numerology.

Here, numerology may be a communication parameter applied to at least one of transmission and reception of a certain signal or channel. Numerology may indicate at least one of, for example, a subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, and a specific windowing processing performed by the transceiver in a time domain.

The slot may be constituted by one or more symbols (orthogonal frequency division multiplexing (OFDM) symbols, single carrier frequency division multiple access (SC-FDMA) symbols, and the like) in a time domain. Further, the slot may be a time unit based on numerology.

The slot may include a plurality of mini slots. Each mini slot may be constituted by one or more symbols in the time domain. Further, a mini slot may be referred to as a subslot. Each mini slot may be constituted by fewer symbols than a slot. A PDSCH (or PUSCH) transmitted in a time unit larger than a mini slot may be referred to as PDSCH (PUSCH) mapping type A. A PDSCH (or PUSCH) transmitted using the mini slot may be referred to as PDSCH (PUSCH) mapping type B.

The radio frame, the subframe, the slot, the mini slot, and the symbol all represent a time unit in signal transmission. The radio frame, the subframe, the slot, the mini slot, and the symbol may be each called by other applicable names. Note that time units such as the frame, the subframe, the slot, the mini slot, and the symbol in the present disclosure may be replaced with each other.

For example, one subframe may be referred to as TTI, a plurality of consecutive subframes may be referred to as TTI, or one slot or one mini slot may be referred to as TTI. That is, at least one of the subframe and TTI may be a subframe (1 ms) in the existing LTE, may be a period shorter than 1 ms (for example, one to thirteen symbols), or may be a period longer than 1 ms. Note that the unit to represent TTI may be referred to as the slot, the mini slot, or the like instead of the subframe.

Here, TTI refers to a minimum time unit of scheduling in radio communication, for example. For example, in LTE systems, the base station schedules the radio resources (such as the frequency bandwidth and transmission power that can be used in each user terminal) to allocate to each user terminal in TTI units. Note that the definition of TTI is not limited thereto.

TTI may be a transmission time unit such as a channel-encoded data packet (transport block), a code block, or a codeword, or may be a processing unit such as scheduling or link adaptation. Note that, when TTI is given, a period of time (for example, the number of symbols) in which a transport block, a code block, a codeword, and the like are actually mapped may be shorter than the TTI.

Note that, when one slot or one mini slot is referred to as TTI, one or more TTIs (that is, one or more slots or one or more mini slots) may be a minimum time unit of scheduling. Further, the number of slots (the number of mini slots) constituting the minimum time unit of scheduling may be controlled.

TTI having a time length of 1 ms may be referred to as usual TTI (TTI in 3GPP Rel. 8 to 12), normal TTI, long TTI, a usual subframe, a normal subframe, a long subframe, a slot, or the like. TTI shorter than normal TTI may also be referred to as shortened TTI, short TTI, partial TTI (or fractional TTI), a shortened subframe, a short subframe, a mini slot, a subslot, a slot, or the like.

Note that long TTI (for example, normal TTI or a subframe) may be replaced with TTI having a time length exceeding 1 ms, and short TTI (for example, shortened TTI) may be replaced with TTI having a TTI duration less than the TTI duration of long TTI and equal to or more than 1 ms.

The resource block (RB) is a resource allocation unit in a time domain and a frequency domain, and may include one or more consecutive subcarriers in the frequency domain. The number of subcarriers included in the RB may be the same regardless of the numerology, and may be 12, for example. The number of subcarriers included in the RB may be determined based on numerology.

Further, the RB may include one or more symbols in a time domain, and may have a length of one slot, one mini slot, one subframe, or one TTI. One TTI, one subframe, and the like may be each constituted by one or more resource blocks.

Note that one or more RBs may be referred to as a physical resource block (PRB), a sub-carrier group (SCG), a resource element group (REG), a PRB pair, an RB pair, or the like.

Further, the resource block may be constituted by one or more resource elements (REs). For example, one RE may be a radio resource domain of one subcarrier and one symbol.

A bandwidth part (BWP) (which may be referred to as a partial bandwidth or the like) may represent a subset of consecutive common resource blocks (RBs) for a certain numerology in a certain carrier. Here, the common RB may be specified by the index of the RB based on a common reference point of the carrier. The PRB may be defined in a certain BWP and may be numbered within the BWP.

The BWP may include BWP for UL (UL BWP) and BWP for DL (DL BWP). For the UE, one or more BWPs may be configured within one carrier.

At least one of the configured BWPs may be active, and the UE need not assume that a given signal/channel is transmitted/received outside the active BWP. Note that "cell", "carrier", or the like in the present disclosure may be replaced with "BWP".

Note that the structures of the radio frame, subframe, slot, mini slot, symbol, and the like described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in TTI, the length of a symbol, and the length of a cyclic prefix (CP) can be variously changed.

Further, the information, parameters, and the like described in the present disclosure may be represented using absolute values or relative values with respect to given values, or may be represented using other corresponding information. For example, a radio resource may be instructed by a given index.

Names used for parameters and the like in the present disclosure are not restrictive names in any respect. In addition, an equation and the like using these parameters may differ from those explicitly disclosed in the present disclosure. Since various channels (physical uplink control channel (PUCCH), physical downlink control channel (PDCCH), and the like) and information elements can be identified by any suitable names, various names assigned to these various channels and information elements are not restrictive names in any respect.

The information, signals, and the like described in the present disclosure may be represented by using any one of various different technologies. For example, data, instruction, command, information, a signal, a bit, a symbol, a chip, or the like that may be mentioned throughout the above description may be represented by voltage, current, electromagnetic wave, magnetic field or magnetic particles, optical field or photons, or an arbitrary combination thereof.

Further, information, a signal, and the like can be output in at least one of a direction from a higher layer to a lower layer and a direction from a lower layer to a higher layer. Information, a signal, and the like may be input/output via a plurality of network nodes.

The input/output information, signal, and the like can be stored in a specific location (for example, a memory) or can be managed using a management table. The information, signals and the like to be input and output can be overwritten, updated or appended. The information, signals and the like that are output may be deleted. The information, signal, and the like that are input may be transmitted to another apparatus.

Notification of information may be performed not only by using the aspects/embodiments described in the present disclosure but also using another method. For example, notification of information in the present disclosure may be performed by using physical layer signaling (for example, downlink control information (DCI), uplink control information (UCI)), higher layer signaling (for example, radio resource control (RRC) signaling, broadcast information (master information block (MIB), system information block (SIB), or the like), medium access control (MAC) signaling), another signal, or a combination thereof.

Note that the physical layer signaling may be referred to as layer 1/layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message and the like. Further, notification of MAC signaling may be performed using, for example, a MAC control element (MAC CE).

Further, notification of given information (for example, notification of "being X") is not limited to explicit notification but may be performed implicitly (for example, by not performing notification of the given information or by performing notification of another piece of information).

Judging may be performed using values represented by one bit (0 or 1), may be performed using Boolean values represented by true or false, or may be performed by comparing numerical values (for example, comparison with a given value).

Software should be widely interpreted to mean instruction, an instruction set, a code, a code segment, a program code, a program, a subprogram, a software module, an application, a software application, a software package, a routine, a subroutine, an object, an executable file, an execution thread, a procedure, a function, and the like regardless of whether being referred to as software, firmware, middleware, a microcode, and a hardware description language or referred to as another name.

Further, software, instruction, information, and the like may be transmitted/received via a transmission medium. For example, when software is transmitted from a website, a server, or another remote source by using at least one of a wired technology (coaxial cable, optical fiber cable, twisted pair, digital subscriber line (DSL), or the like) and a wireless technology (infrared rays, microwaves, and the like), at least one of the wired technology and the wireless technology is included within the definition of a transmission medium.

The terms "system" and "network" used in the present disclosure can be used interchangeably. The "network" may mean an apparatus (for example, a base station) included in the network.

In the present disclosure, terms such as "precoding", "precoder", "weight (precoding weight)", "quasi-Co-Location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be interchangeably used.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. When a base station accommodates a plurality of cells, the entire coverage area of the base station can be partitioned into multiple smaller areas, and each smaller area can provide communication services through base station subsystems (for example, indoor remote radio heads (RRHs)). The term "cell" or "sector" refers to a part or the whole of a coverage area of at least one of a base station and a base station subsystem that perform a communication service in this coverage.

In the present disclosure, the terms such as "mobile station (MS)", "user terminal", "user equipment (UE)", "terminal", and the like can be used interchangeably.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms.

At least one of the base station and the mobile station may be referred to as a transmission apparatus, a reception apparatus, a radio communication apparatus, and the like. Note that at least one of the base station and the mobile station may be a device mounted on a moving object, a moving object itself and the like. The moving object may be a transportation (for example, a car, an airplane and the like), an unmanned moving object (for example, a drone, an autonomous car, and the like), or a (manned or unmanned) robot. Note that at least one of the base station and the mobile station also includes an apparatus that does not necessarily move during a communication operation. For example, at least one of the base station and the mobile station may be an Internet of Things (IoT) device such as a sensor.

Further, the base station in the present disclosure may be replaced with the user terminal. For example, each aspect/embodiment of the present disclosure may be applied to a configuration in which communication between the base station and the user terminal is replaced with communication among a plurality of user terminal (which may be referred to as, for example, device-to-device (D2D), vehicle-to-everything (V2X) and the like). In this case, the user terminal 20 may be configured to have the functions of the base station 10 described above. Further, the wording such as "uplink" and "downlink" may be replaced with the wording corresponding to the terminal-to-terminal communication (for example, "side"). For example, the uplink channel, the downlink channel, and the like may be replaced with a side channel.

Similarly, the user terminal in the present disclosure may be replaced with a base station. In this case, the base station 10 may be configured to have the above-described functions of the user terminal 20

In the present disclosure, the operation performed by the base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station), or a combination thereof.

Each aspect/embodiment described in the present disclosure may be used alone, used in combination thereof, or switched depending on execution. Further, the order of processing procedures, sequences, flowcharts, and the like of the aspects/embodiments described in the present disclosure may be re-ordered as long as inconsistencies do not arise. For example, regarding the methods described in the present disclosure, elements of various steps are presented using an illustrative order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new radio access technology (New-RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded based on these, and the like. Further, a plurality of systems may be combined (for example, a combination of LTE or LTE-A and 5G) and applied.

The phrase "based on" used in the present disclosure does not mean "based only on" unless otherwise specified. In other words, the phrase "based on" means both "based only on" and "based at least on".

Any reference to an element using designations such as "first" and "second" used in the present disclosure does not generally limit the amount or order of these elements. These designations may be used in the present disclosure as a method convenient in distinguishing between two or more elements. Therefore, reference to the first and second elements does not mean that only two elements are adoptable, or that the first element must precede the second element in some way.

The term "deciding (determining)" used in the present disclosure may encompass a wide variety of operations. For example, "deciding (determining)" may be considered as "deciding (determining)" of judging, calculating, computing, processing, deriving, investigating, looking up, search, or inquiry (for example, looking up in a table, database, or another data structure), ascertaining, and the like.

Further, "deciding (determining)" may be considered as "deciding (determining)" of receiving (for example, receiving information), transmitting (for example, transmitting information), input, output, accessing (for example, accessing data in a memory), and the like.

Further, "deciding (determining)" may be considered as "deciding (determining)" of resolving, selecting, choosing, establishing, comparing, and the like. In other words, "deciding (determining)" may be considered as "deciding (determining)" of some operation.

Further, "deciding (determining)" may be replaced with "assuming", "expecting", "considering", and the like.

As used in the present disclosure, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be replaced with "access".

In the present disclosure, when two elements are connected, these elements may be considered "connected" or "coupled" to each other by using one or more electrical wires, cables, printed electrical connections, and the like, and, as some non-limiting and non-inclusive examples, by using electromagnetic energy having wavelengths in a radio frequency domain, a microwave domain, and an optical (both visible and invisible) domain, or the like.

In the present disclosure, the phrase "A and B are different" may mean "A and B are different from each other". Note that the phrase may mean that "A and B are different from C". The terms such as "separated", "coupled", and the like may be interpreted as "different".

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, for example, when translations add articles, such as a, an, and the in English, the present disclosure may include that the noun that follows these articles is in the plural.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided for the purpose of exemplification and explanation, and has no limitative meaning to the invention according to the present disclosure.

The invention claimed is:

1. A terminal comprising:
a processor that, when spatial relation information for a sounding reference signal (SRS) is not configured, applies a spatial domain filter used to receive a downlink reference signal (DL RS) corresponding to physical random access channel (PRACH) to the SRS; and
a transmitter that transmits the SRS by applying the spatial domain filter.

2. The terminal according to claim 1, wherein the processor, in a frequency range higher than 24 GHz, applies the spatial domain filter to the SRS.

3. A radio communication method for a terminal comprising:
when spatial relation information for a sounding reference signal (SRS) is not configured, applying a spatial domain filter used to receive a downlink reference signal (DL RS) corresponding to physical random access channel (PRACH) to the SRS; and
transmitting the SRS by applying the spatial domain filter.

4. A base station comprising:
a processor that, when spatial relation information for a sounding reference signal (SRS) is not configured to a terminal, determines that a spatial domain filter used to receive a downlink reference signal (DL RS) corresponding to physical random access channel (PRACH) is applied to the SRS;
a receiver that receives the SRS applied the spatial domain filter.

5. A system comprising a terminal and a base station, wherein:
the terminal comprises:
a processor that, when spatial relation information for a sounding reference signal (SRS) is not configured, applies a spatial domain filter used to receive a downlink reference signal (DL RS) corresponding to physical random access channel (PRACH) to the SRS; and
a transmitter that transmits the SRS by applying the spatial domain filter;
the base station comprises:
a receiver that receives the SRS.

* * * * *